United States Patent [19]

Mieth

[11] Patent Number: 4,687,015

[45] Date of Patent: Aug. 18, 1987

[54] PROCESS FOR THE SIMULTANEOUS CLEANING OF BOTH SEAT SURFACES OF A DOUBLE SEAT VALVE WITH A PRODUCT ACTION ON AT LEAST ONE SIDE AND DEVICE TO PERFORM THE PROCESS

[75] Inventor: Hans O. E. Mieth, Hamburg, Fed. Rep. of Germany

[73] Assignee: Otto Tuchenhagen GmbH & Co. KG, Buchen, Fed. Rep. of Germany

[21] Appl. No.: 643,747

[22] Filed: Aug. 23, 1984

Related U.S. Application Data

[63] Continuation of Ser. No. 283,185, Jul. 14, 1981, abandoned.

[30] Foreign Application Priority Data

Jul. 22, 1980 [DE] Fed. Rep. of Germany ....... 3027647
Mar. 7, 1981 [DE] Fed. Rep. of Germany ....... 3108778

[51] Int. Cl.$^4$ .......................................... F16K 25/00
[52] U.S. Cl. ................... 137/238; 137/240; 137/312; 137/614.11; 137/614.18
[58] Field of Search ............ 137/15, 240, 312, 614.11, 137/614.18, 614.19, 630.19, 630.22, 240, 239, 241, 65, 238

[56] References Cited

U.S. PATENT DOCUMENTS

| 4,304,251 | 12/1981 | Schädel et al. ........... 137/240 |
| 4,344,453 | 8/1982 | Tuchenhagen et al. ........ 137/240 |
| 4,368,753 | 1/1983 | Bräkelmann et al. ........ 137/240 |
| 4,373,545 | 2/1983 | Knappe ................ 137/240 |

FOREIGN PATENT DOCUMENTS

| 2430030 | 1/1976 | Fed. Rep. of Germany ...... 137/240 |
| 2449432 | 4/1976 | Fed. Rep. of Germany . |
| 2456675 | 6/1976 | Fed. Rep. of Germany . |
| 2609791 | 9/1977 | Fed. Rep. of Germany ...... 137/240 |
| 2750833 | 5/1979 | Fed. Rep. of Germany . |
| 2751734 | 6/1979 | Fed. Rep. of Germany . |
| 8003805 | 2/1980 | Fed. Rep. of Germany . |

*Primary Examiner*—Robert G. Nilson
*Attorney, Agent, or Firm*—Lane & Aitken

[57] ABSTRACT

A method and apparatus for simultaneously cleaning both seat surfaces of a double seat valve particularly adapted for use in the food processing industry is disclosed. The valve includes a pair of closing elements movable relative to the valve seats and to each other to define valve open and valve closed positions and a controllable stop and controllable connector which provide a partially lifted cleaning position in which both seat surfaces are simultaneously exposed to a cleaning agent while at least one of the closing elements continues to be in contact with product. The position of the closing elements relative to each other and relative to the valve casing is interlocked by the stop and the connector so that no cleaning agent enters the product side of the valve.

18 Claims, 21 Drawing Figures

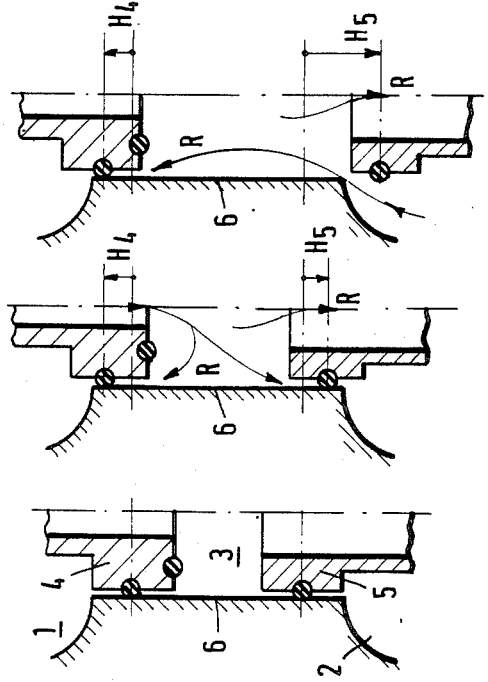
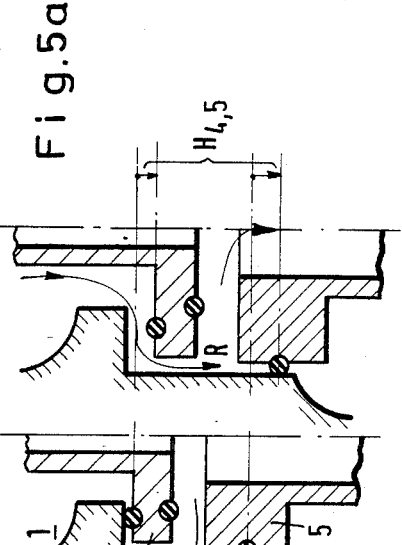

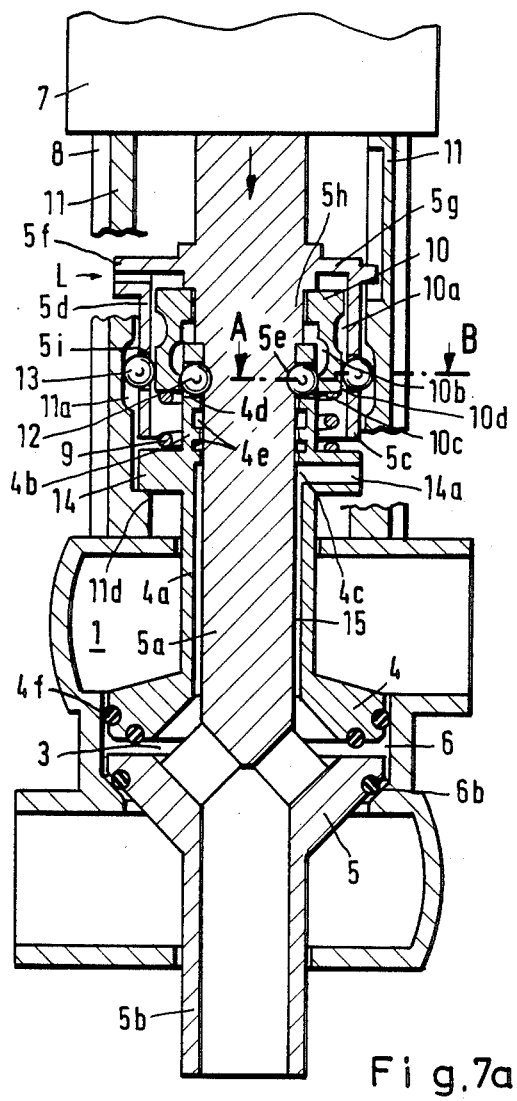
Fig.7
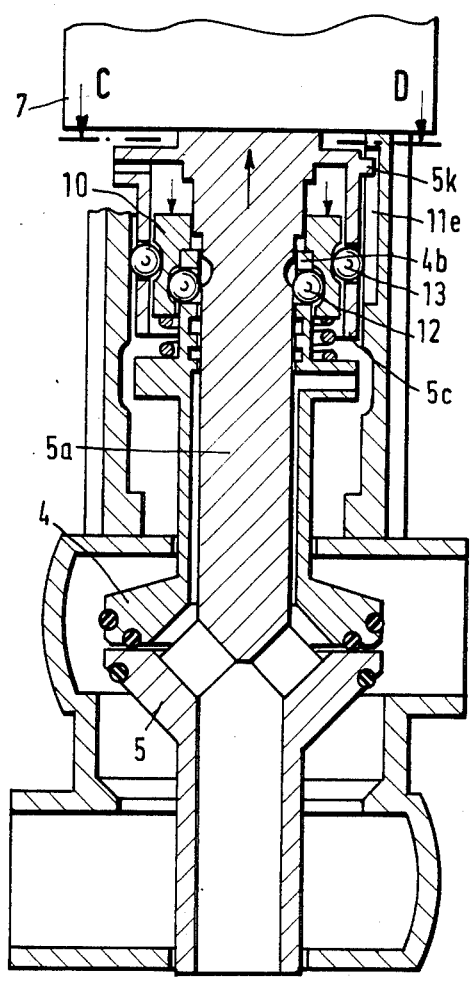
Fig.8
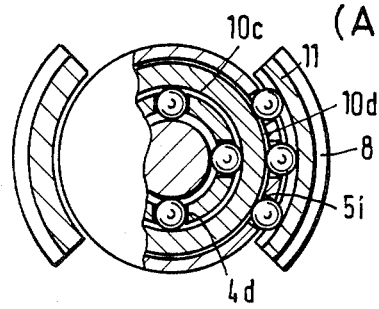
Fig.7a (A-B)
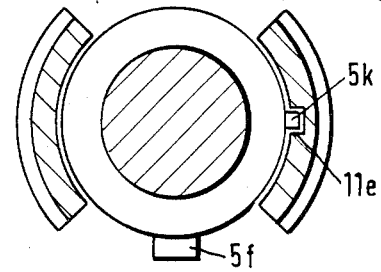
Fig.8a (C-D)

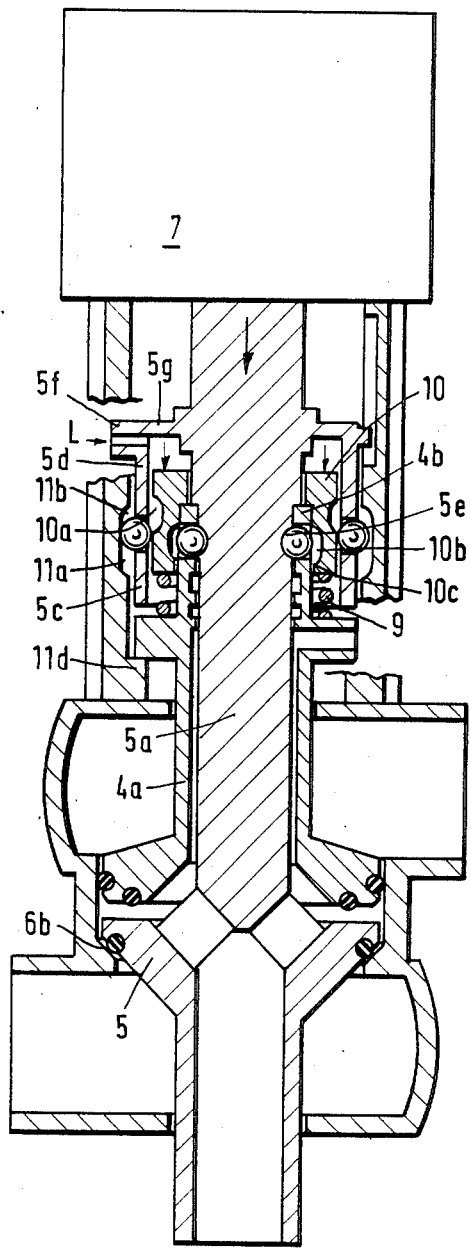
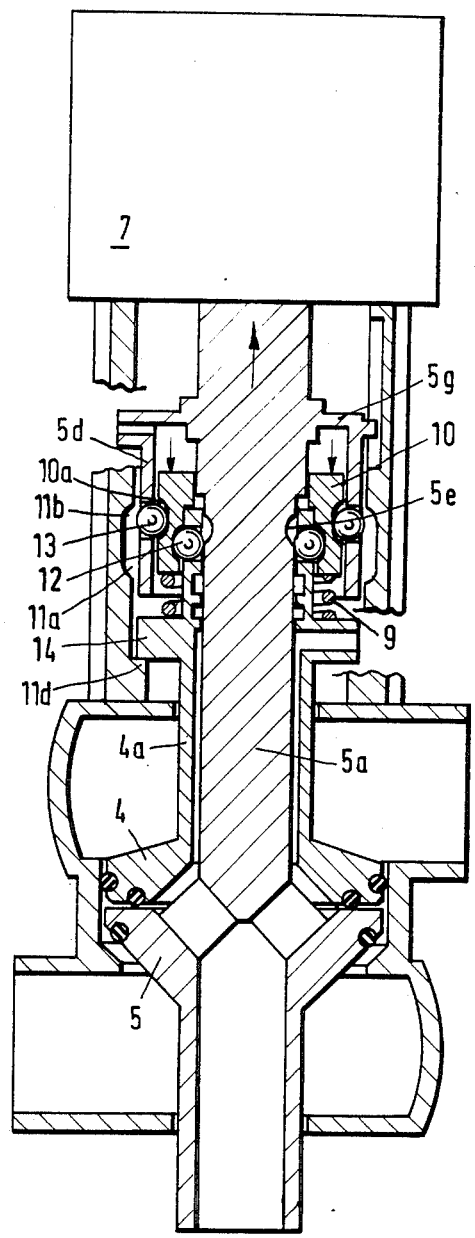

(E-F)

PROCESS FOR THE SIMULTANEOUS CLEANING OF BOTH SEAT SURFACES OF A DOUBLE SEAT VALVE WITH A PRODUCT ACTION ON AT LEAST ONE SIDE AND DEVICE TO PERFORM THE PROCESS

This application is a continuation of application Ser. No. 283,185, filed July 14, 1981, now abandoned.

BACKGROUND OF THE INVENTION

1. Field of the Invention

The invention relates to a process for the simultaneous cleaning of both seat surfaces of a double seat valve that is in contact with product on at least one side. The process is particularly suited for use in the food processing industry. The process involves supplying cleaning and/or disinfecting agents to a given double seat valve to clean it. The valve is equipped with two closing elements that are movable independently and relative to each other. The closing elements are moved from the closed position into an open position by activating mechanisms. At least one closing element is piston like and can be moved within a cylinder bore-hole connecting the two valve casings while providing a radial seal. The closing elements enclose between them a leakage cavity, in the closed as well as in the open position. The leakage cavity opens outside the valve through a borehole within the valve stem of the lower closing element leading from the valve casing in a downward direction.

2. Discussion of Related Art

In the known double seat valves, only the cleaning of the seat surfaces of the lower closing element is possible, as in German Pat. No. 24 56 675, or the cleaning of both seat surfaces is possible, but only at different times, as in German Utility Pat. No. 80 03 805, that is, the cleaning of the seat surface of the closing element in contact with the product cannot be performed at the same time as the cleaning of the seat surface of the other closing element while the product is present. The product is always present, for example, in the case of container stop valves, if they are designed as double seat valves. In these valves, the valve casing on the container side as well as its closing element is continually in contact with the product, while the other valve casing, which is a part of the piping, is cleaned by flushing it at more or less regular intervals. In the case of the aforementioned known double seat valves, the closing element blocking the piping being cleaned is partially raised by an activating device that is independent of the main drive, so that the seat surface corresponding to this closing element is cleaned,. In this operation, the cleaning agent enters the leakage cavity between the closing elements through a gap between a closing element and its seating surface. From there the cleaning agent is discharged outside the valve through a borehole within the valve stem of the lower closing element which points downward, out of the valve casing.

SUMMARY OF THE INVENTION

Broadly stated, the object of the present invention is to enable both seat surfaces of a double seat valve that is in contact with the product on at least one side, to be cleaned simultaneously.

This object is accomplished because of the particular design of the closing element that is in contact with the product, which is piston-like and can thus be moved within a cylinder borehole by a partial lift in the direction of the product-carrying valve casing for cleaning and/or disinfecting its seat, and, at the same time, of the other closing element which can be moved from its seat surface opposite the closing element in contact with the product by a parallel or opposing partial lift. The cleaning and/or disinfecting agent is carried through the other valve casing part, and/or from outside of the double seat valve through the leakage cavity, to the two exposed seat surfaces.

Because of the piston-like design of the closing element in contact with the product, it is possible to move this closing element by a partial lift within the cylinder borehole in the direction of the product-carrying valve casing without impairing its sealing function. With regard to the other closing element, alternatively proposed measures permit a partial lift for that other closing element in order to obtain a simultaneous cleaning of both seat surfaces whereby the cleaning agent can be discharged outside the double seat valve either through the leakage cavity or through the gap produced by the partial lift of that other closing element from the respective valve casing. In particular, the cleaning process can be intensified in the seat area, which is in contact with the product, by repeating the partial lifting movements several times.

A further object of the invention is to secure the piston-like closing element against involuntary shifts due to product or cleaning agent pressure on a device performing the process according to the invention. It is also an object of the present invention to secure the closing elements in position relative to each other in the closed position as well as in the open position of the double seat valve, and to assure constant clearance between the closing elements in each phase of the partial lift movement for discharging the cleaning agent when the seat surfaces of the double seat valve are cleaned. It is a further object of the present invention to permit cleaning of the annular gap between the hollow stem and the valve stem while the valve is in the open as well as the closed position and also to detect and indicate a closed condition of both closing elements of the double seat valve by means of a single mechanism.

These objects are accomplished because of the fact that:

(a) the valve stems of the closing elements point in the same direction, engaging each other in a telescopic manner;

(b) those valve stems extend out of the valve casing itself on the side of the piston-like closing element;

(c) the valve stems are connected to the activating mechanism;

(d) the valve stems can be coupled to each other in the area in which they overlap, in either a linked or a linked and pressure-locked manner, by means of controllable connectors whose position can be monitored by means of a position indicating mechanism; and (e) the lift of the valve stem connected to the seat disk can be limited by means of controllable stops and the closing position of the piston-like closing element is determined by a fixed stop.

A double seat valve, to perform the process of the present invention, needs only to be equipped with a simple standard drive whose operating piston has a pressure source on only one side. This simplifies the structure usually required by double seat valves.

On the one hand, the device for performing the process of the present invention enables the seats of the double seat valve to be cleaned using cleaning agents that are supplied through the valve casing adjacent to the seat disc to the exposed seat surfaces. The device also, on the other hand, enables the leakage cavity and the annular gap between the hollow stem and the valve stem to be cleaned using cleaning agents that are supplied through the annular gap from outside the valve, by extending the hollow stem as well as the valve stem outside the valve casing itself.

The piston-like closing element is secured against shifting due to product or cleaning agent pressure by the controllable connectors, in the closed as well as in the cleaning position of the double seat valve.

Furthermore, the device assures constant clearance between the closing elements of the double seat valve in every phase of the partial lift movement during seat cleaning, a clearance which corresponds to the distance between the two closing elements when on their respective seats.

It is also possible to determine whether the two closing elements have returned to their closed position by monitoring a single component, i.e. the connectors. Thus, for example, it is possible to start the seat cleaning of the double seat valve only after the two closing elements have reached a particular closed position.

In a further embodiment of the present invention, the feed gap between the seat disc and its seat surface has a greater pressure loss than the discharge gap between the seat disc and the piston-like closing element to prevent an inadmissible pressure build-up by the cleaning agent in the leakage cavity during seat cleaning.

Another embodiment of the present invention provides a ring-shaped throttling gap between the seat disc and the cylinder borehole that has a higher pressure loss than the feed gap between the seat disc and its seat surface. Thus, the leakage past the seat disc after the seat disc has left its seat surface is limited. Additionally, the nozzle-shaped design of the outlet of the throttling gap assures that the seat surface of the piston-like closing element on the cylinder borehole that is exposed by the partial like of the closing element, is rinsed in a targeted manner with cleaning and/or disinfecting agents.

By designing the device for performing the process in accordance with a further embodiment, at least two additional advantages are obtained. First, the controllable connectors and controllable stops are simply spheres which are actuated by means of a single component, i.e. a control piston. Second, the two closing elements are locked against each other in the open position of the double seat valve.

According to a further embodiment of the device, cleaning of the leakage cavity is also accomplished by introducing the cleaning agent into the leakage cavity from outside the double seat valve through a cleaning agent connection having a passage opening into the hollow stem head, and thence into the annular gap between the hollow stem and the valve stem. Another advantageous feature of the device is that the closed position of both closing elements of the double seat valve can be indicated by means of a single mechanism which determines the position of one component.

Still another feature of the device provides an indication of the closed position of both closing elements of the double seat valve indirectly through a movable component. The position of the movable component detecting the proper closed position of the double seat valve is clearly determined by both the position of the hollow stem and the position of the valve stem corresponding to the proper closed position. The advantage of this general design becomes clear in a further embodiment, in which a control piston is the movable component which controls the position indicating mechanism by means of the control piston jacket, whose resting position corresponds to the proper closing position of the double seat valve. The advantage of detecting the closing position of each closing element indirectly by using the control piston is a result, on the one hand, of the control piston's easy accessibility to the position indicating mechanism and, on the other hand, of the control piston's inability to reach the resting position unless both closing elements are in the closed position.

Another embodiment of the device provides for the installation of all components required for the implementation of the connectors, the position signaling mechanism and the controllable stops in the stem housing of a standard valve. Since this stem housing constitutes a necessary connecting element between the valve casing and the drive mechanism even in double seat valves that are not adapted for seat cleaning, the structural measures necessary for seat cleaning do not require an enlargement of the structural dimensions of these double seat valves.

BRIEF DESCRIPTION OF THE DRAWINGS

Preferred embodiments of the invention that are described in detail below are shown in the drawing wherein:

FIGS. 1-5a are schematic diagrams of apparatus according to the present invention;

FIG. 7 is a longitudinal cross section through a preferred embodiment of the double seat valve in the area of the stem housing, showing the closed position;

FIG. 7a is a cross section through the aforementioned embodiment of FIG. 7 taken along line A-B of FIG. 7;

FIG. 8 is a longitudinal cross section through the double seat valve of the aforementioned preferred embodiment, showing the open position of the double seat valve;

FIG. 8a is the top view of the aforementioned embodiment showing the structure below the flange;

FIGS. 9 and 10 are longitudinal cross sections through the double seat valve according to the aforementioned embodiment, with the control cylinder shown in an intermediate position between the closed and open positions of the double seat valve;

DETAILED DESCRIPTION OF THE PREFERRED EMBODIMENTS

Figure 6:
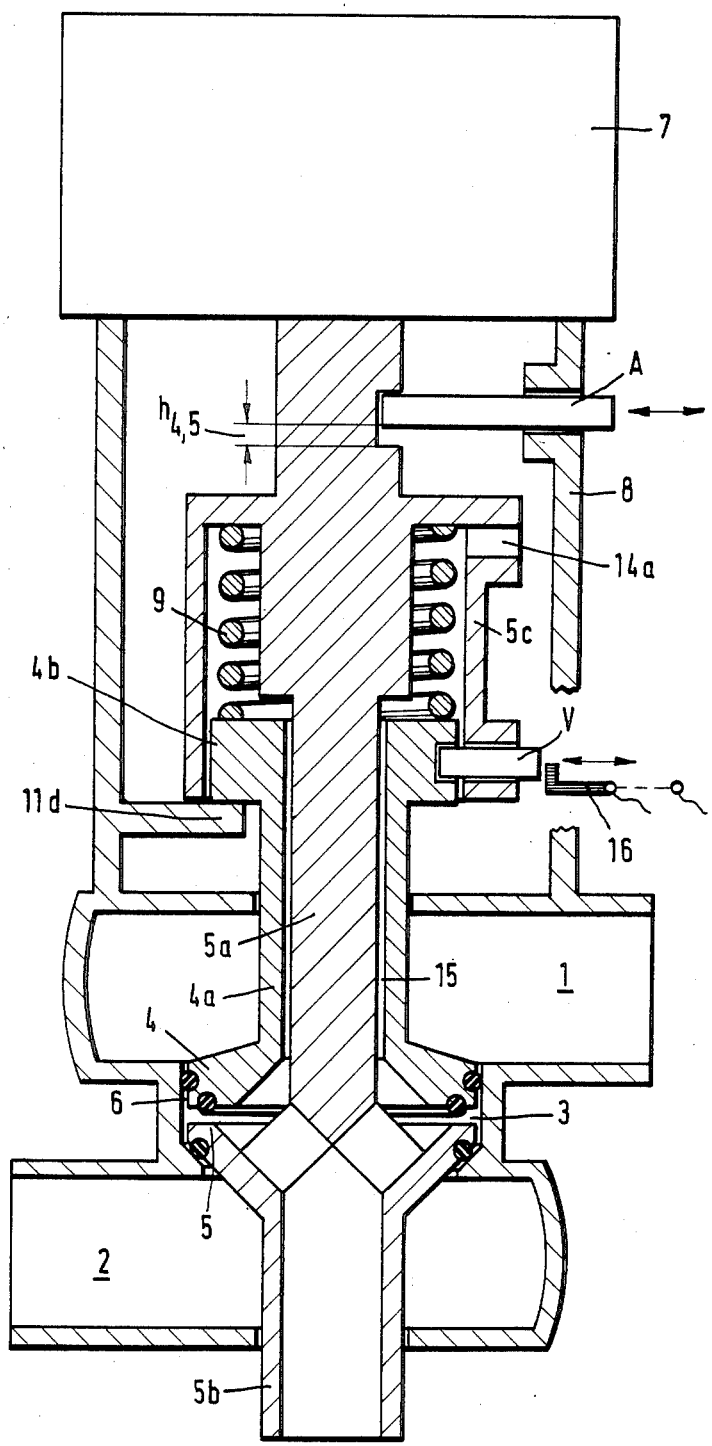
FIG. 6 is a longitudinal cross section through a double seat valve with a device to perform the process in accordance with the invention.

The closing elements 4 and 5 are piston-like as shown in FIGS. 1 to 1b, and are moved independently by an actuating system in opposing directions by partial lifts through distances designated by the letters $H_4$ and $H_5$, respectively. A cleaning agent R is supplied in conjunction with shifting the closing elements 4 and 5 within the cylinder borehole 6. The cleaning agent either passes through a leakage cavity 3 as shown in FIG. 1a or, when the closing element is shifted in a partial lift $H_5$, it passes out of the valve casing part 2 through the cylinder borehole 6, as shown in FIG. 1b. In the latter case, only the closing element 4 is in contact with the product while, with the arrangement shown in FIG. 1a, the product can be present in both valve casing 1 and valve casing 2.

In another advantageous arrangement, shown in FIGS. 2 to 3a, the closing elements 4 and 5 are moved by the actuation system through partial lifts $H_4$ and $H_5$ in opposite directions. The closing element 5, as seen in FIGS. 2 and 2a, or the closing element 4 as seen in FIGS. 3 and 3a, which is in contact with product, is piston-like. It can be shifted for cleaning its seat by a partial lift $H_5$ or $H_4$ in the direction of the product-carrying valve casing 2 or 1, respectively, within the cylinder borehole 6. The closing element 4, as seen in FIGS. 2 and 2a, or the closing element 5, as shown in FIGS. 3 and 3a, which is a seat disc, can be axially shifted so that the cleaning agent can be supplied through the valve casing 1, in FIGS. 2 and 2a, or through the valve casing 2, in FIGS. 3 and 3a, by partial lift $H_4$ or $H_5$ in opposition to the closing element in contact with the product.

In the embodiment of FIGS. 4 to 5a, the closing elements 4 and 5 can be connected with each other and shifted together in the same direction through the partial lift $H_{4,5}$ using a joint actuation system. The closing element that is in contact with the product, closing element 4 shown in FIGS. 4 and 4a, or the closing element 5 shown in FIGS. 5 and 5a, is piston-like, as is well known. The other closing element 5 or 4, respectively, has the shape of a seat disc. The cleaning agent is supplied to the two exposed seat surfaces through a gap between the seat disc 5 or 4, and the seat surface of the valve casing 2 or 1 which corresponds to the seat disk.

Apparatus providing the simultaneous cleaning of both seat surfaces of a double seat valve that is in contact with product on at least one side during this cleaning is briefly described below in connection with the basic structure of a double seat valve. The device shown in FIG. 6 is a preferred embodiment advantageously using the structural arrangements shown in FIGS. 4 to 5a.

The double seat valve shown in FIG. 6 comprises the valve casings 1 and 2, a valve stem housing 8, and an activating mechanism 7. Closing elements 4 and 5 are located between the valve casings 1 and 2. The upper, piston-like closing element 4 has a cylinder borehole 6 as its seat surface. The lower closing element 5 is designed as a seat disc that has its own seat surface adjacent at an angle to the cylinder borehole 6 and in fluid communication with a pipe 5b which exits the valve casing 2 in a downward direction. A leakage cavity 3 is located between the two closing elements 4 and 5. The seat disk 5 is connected to the activating mechanism 7 by means of a valve stem 5a. The valve stem 5a is concentrically enclosed by a hollow stem 4a connected to the piston-like closing element 4. The upper end of the hollow stem 4a, the hollow stem head 4b, supports a spring 9 against the base of a spring chamber 5c which opens downward and is connected to the valve stem 5a. The spring chamber 5c has a cleaning agent connection 14a and is connected with the leakage cavity 3 through an annular gap 15 between the hollow stem 4a and the valve stem 5a for supplying the cleaning agent to the leakage cavity. The hollow stem 4a and the valve stem 5a can be linked or linked and pressure-locked together where they overlap by controllable connectors V. The position of the connectors V is monitored by means of a position indicating mechanism 16. Controllable stops A provides a partial lift by limiting upward movement of the valve stem and thus, also, of the seat disk 5 to the distance $H_{4,5}$. The vertical movement of the hollow stem 4a and thus of the piston-like closing element 4 is also limited in a downward direction by a fixed stop 11d.

As to the operation of the above-described double seat valve, there are two modes of operation: (1) the opening/closing mode of the double seat valve, and (2) the cleaning mode.

The double seat valve begins to open to the passage of product when both the controllable stop A and the controllable connector V are triggered. This means that the locking of the valve stem 5a by the controllable stop A and the coupling of the hollow stem 4a to the valve stem 5a by the controllable connector V are released. When drive is subsequently applied by the activating mechanism 7, the seat disk 5 connected through the valve stem 5a to the actuation system 7 moves upward until it contacts the piston-like closing element 4 during the first part of a full lift. The seat disk then carries the piston-like closing element 4 through the second part of the full lift into the open position as the upward, opening movement continues, and a connection is established between the valve casing parts 1 and 2. The leakage cavity 3 between the seat disk 5 and the piston-like closing element 4 inside the valve casing is closed off, and can be cleaned in this position by supplying a cleaning agent from outside the double seat valve by way of the cleaning agent connection 14a, the spring chamber 5c and the annular gap 15.

The closed position of the double seat valve is reached from the open position by reversing this sequence of operation. The attainment of the closed position, when the piston-like closing element 4 on the hollow stem 4a as well as by the seat disk 5 on the valve stem 5a reach the closed position, is detected and indicated indirectly by the position indicating mechanism 16 using the connectors V.

Seat cleaning in the double seat valve is carried out by applying the drive from activating mechanism 7, without triggering controllable stop A and connector. Because of the coupling of the hollow stem 4a with the valve stem 5a through the controllable connector V, the seat disk 5 and the piston-like closing element 4 are rasied from their closed positions by the lift $h_{4,5}$ while maintaining the clearance existing between them in the closed position. The partial lift is provided by the controllable stop A which limits the lift provided by the activating mechanism 7. The cleaning and/or disinfecting agent can then enter the leakage cavity 3 from the casing part 2 by way of the feed gap between the seat disk 5 and its seat and a throttling gap 6a between the seat disk 5 and the cylinder borehole 6. The seat surface of the piston-like closing element 4 on the cylinder borehole 6, which is exposed by the partial lift $h_{4,5}$ is rinsed in a targeted manner with cleaning and/or disinfecting agents by the nozzle-like outlet of the throttling gap. The seat-cleaning process can be carried out by means of a single partial lift or by several repetitions of the partial lift. In either case, the cleaning and/or disinfecting agent is discharged downward through a pipe 5b connected to the seat disk 5 that opens downward out of the valve casing 2.

In the embodiment shown in FIG. 7, the hollow stem 4a which concentrically encloses the valve stem 5a ends inside the valve stem housing 8, which connects the activating mechanism 7 with the valve casing part 1. The base 5g of the control cylinder 5d, and spring chamber 5c below the base 5g is detachably connected to the valve stem 5a through a hub 5h. An annular control piston 10 is arranged in the control cylinder 5d. The control piston 10 is sealed against the control cylinder 5d on its cylindrical outer surface and around the hub 5h on its cylindrical inner surface. A ring 14 is affixed to the hollow stem head 4b at the end of the hollow stem 4a. This ring 14 is equipped with the cleaning agent connection 14a that provides a passage for the cleaning agent from outside the valve into the annular gap 15 between the hollow stem 4a and the valve stem 5a through passage openings 4c in the hollow stem head 4b. The hollow stem head 4b is sealed around the valve stem 5a above the passage openings 4c, by means of gaskets 4e so that the upper end of the annular gap 15 is closed off at this point.

A pre-tensioned spring 9 is located between the ring 14 that is directly below the spring chamber 5c and the control piston 10. The spring 9, on the one hand, pushes the control piston 10 upward into its resting position against the base 5g of the control cylinder 5d. On the other hand, the spring 9 pushes the ring 14 against the fixed stop 11d, forcing the hollow stem head 4b, and thus the hollow stem 4a with its piston-like closing element 4 downward. The stop 11d is a projection extending radially inward on the annular, segmentally-shaped stem housing insert 11. This radial projection of stop 11d limits the downward movement of the piston-like closing element 4. The two stem housing inserts 11 are diametrically arranged and connected to the valve casing 8 in a detachable manner. The seat disk 5 which is biased against its seat surface 6b through the valve stem 5a by a spring in the activating mechanism 7, in a manner well-known in the art, is located below the piston-like closing element 4. The piston-like closing element is sealed against the cylinder borehole 6 by a gasket 4f on its circumference. The leakage cavity 3, which opens outside the double seat valve through the annular gap 15 on one side, and through the pipe 5b on the other side, is located between the piston-like closing element 4 and the seat disk 5.

An exterior control piston groove 10a is provided on the outer surface of the control piston 10 above a cylindrical control piston jacket 10d. An interior control piston groove 10b is provided on the inner surface of the control piston 10 above the control piston borehole surface 10c. Two sets of cylinder boreholes, 5i and 4d, are provided on the same level as the control piston jacket 10d and the control piston borehole surface 10c, when the double seat valve is viewed in its closed position, one set on the spring chamber 5c, and the other on the hollow stem head 4b. The latter cylinder boreholes 4d are uniformly distributed around the circumference of the hollow stem head 4b, but the other cylinder boreholes 5i are distributed only on the area of the surface of the spring chamber 5c that is enclosed by a stem housing insert 11, as shown in FIG. 7a. The axes of the cylinder boreholes 4d and 5i, intersect the longitudinal valve axis at a given point for each set of cylinder boreholes, and these two respective points of intersection are vertically displaced from each other along the longitudinal valve axis. An inner or outer ball 12 or 13 which can be shifted slightly along the borehole axis is provided in each cylinder borehole 4d and 5i. The outer balls 13 are pushed against the stem housing inserts 11 by the control piston jacket 10d. The inserts 11 have a groove 11a in this area which holds a portion of each outer ball 13. The inner balls 12 are pushed against the valve stem 5a by the control piston borehole surface 10c. The valve stem 5a has a circular stem groove 5e at this point which holds a portion of each inner ball 12. The control cylinder 5d has a pressure supply connection 5f on its circumference at the level of the base 5g. A compressed fluid L is supplied through connections 5f and presses against the upper surface of the control piston 10. In order to prevent a twisting of the spring chamber 5c carrying the outer balls 13 relative to the circular segments of the stem housing inserts 11, a pin 5k is affixed to the outer jacket surface of the control cylinder 5d. The pin 5k is shifted along the longitudinal valve axis in a longitudinal groove 11e in the right hand connection casing insert 11, as seen in FIGS. 8 and 8a.

Figure 12A:
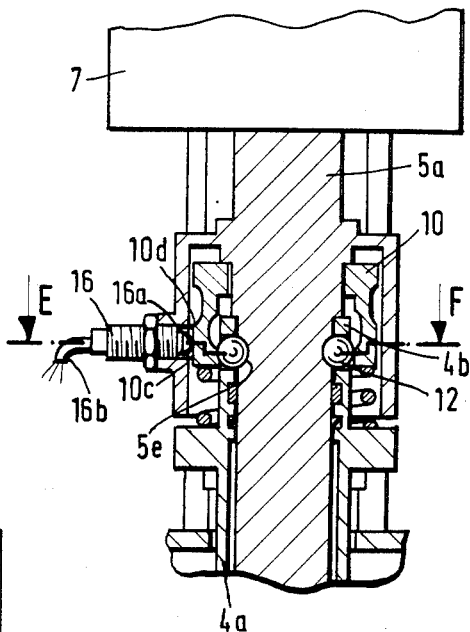
FIG. 12a is a longitudinal cross section through the double seat valve in the area of the position indicating mechanism.
Figure 12B:
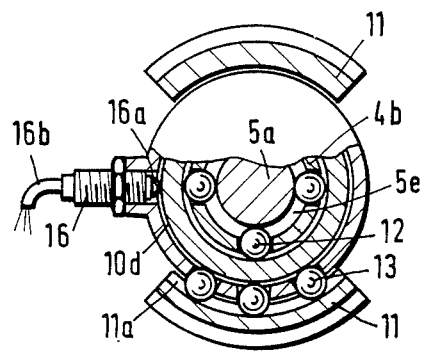
FIG. 12b is a horizontal cross section through the double seat valve according to the aforementioned embodiments in the area of the position indicating mechanism.

The control piston 10 assumes the resting position shown in FIG. 12a when the double seat valve is in the closed position shown in FIG. 7. In this position, the inner balls 12 are pushed into the stem groove 5e by the control piston borehole surface 10c, and the outer balls 13 are pushed in the groove 11a of the stem housing insert 11 by the control piston jacket 10d. The hollow stem head 4b and, thus, the hollow stem 4a of the piston-like closing element 4 is coupled to the valve stem 5a and its seat disk 5, as shown in FIG. 12b. When the activating mechanism 7 is at rest, the seat disk 5 rests on its seat surface 6b while the piston-like closing element 4 is, at a given distance above the seat disk within the cylinder borehole 6. A downward shifting of the piston-like closing element by the force of the spring 9 is prevented by the stop 11d on which the ring 14 affixed to the hollow stem head 4b is resting, as well as by the coupling provided between the hollow stem head 4b and the valve stem 5e by the inner balls 12.

The contact pin 16a, shown in FIGS. 12a and 12b, is activated by the control piston jacket 10d in the above-described at rest position of the control piston 10, or the closed position of the double seat valve. The position indicating mechanism 16 responds to the position changes by the contact pin 16a as an input signal and transmits a signal, preferably binary digital electric output signal through a wire 16b. The position indicating mechanism 16 is located at the level shown in FIG. 12a. When viewed from above, as in FIG. 12b, it is seen to be located between the stem housing inserts 11.

Apparatus for simultaneously cleaning both seat surfaces of a double seat valve that is in contact with product on at least one side operates as described below. In the closed position of the double seat valve shown in FIG. 7 and FIG. 7a, the seat disc 5 and the piston-like closing element 4 are coupled to each other by the inner balls 12, as explained in the structural description provided above. When they are linked, the seat disc 5 is spring-loaded against its seat surface 6b by the spring within the activating mechanism 7, and the piston-like closing element 4, which is thus held at a given distance above the seat disk 5, is also limited in its downward movement by the fixed stop 11d. The opening movement of the double seat valve is described below with the help of FIGS. 7, 9, and 10, step by step.

As soon as the control cylinder 5d with its control piston 10 is triggered by the introduction of the compressed fluid L through the pressure supply connection 5f, the control piston 10 moves downward until it comes to rest against the hollow stem head 4b, as shown in FIG. 9. The pressure of the compressed fluid L is such that it overcomes the force of the spring 9, but it does not oppose the closing force provided by the spring-loaded activating mechanism. This means that the seat disk 5 cannot be shifted from its seat surface 6b while the control cylinder 5d is triggered unless drive is applied by the activating mechanism 7 to begin upward movement of the valve stem 5a. When valve stem 5a moves upward, because the control piston 10 has moved downward, the inner balls 12, which are pushed out of the stem groove 5e by the upward movement of the valve stem 5a, are no longer limited in a radial direction by the control piston borehole 10c but, rather, can move into the groove 10b on the inner surface of the control piston. This movement of the inner balls 12 makes possible an upwardly-directed shift of the valve stem 5a, of the control cylinder 5d connected with it, and of the spring chamber 5c without carrying along the hollow stem head 4b and, thus, the hollow stem 4a. In absolute terms, the control piston 10 remains in its previous position while the distance from the base 5g of the control cylinder 5d to the control piston 10 is increased. As soon as the outer balls 13 in the spring chamber 5c, that are carried upward by the spring chamber 5c, come to rest against the upper flank area 11b of the groove 11a, they are pushed by the upper flank 11b of the groove 11a into the outer control piston groove 10a that was brought into position by the movement of the control piston 10, as shown in FIG. 10. After this first part of the full lift, which is exclusively a movement of the seat disk 5, the seat disk 5 comes to rest against the piston-like closing element 4. The seat disk 5 can then carry the piston-like closing element 4 and its hollow stem 4a during the second part of the full lift, which is the opening movement. As soon as the outer balls 13 have left the groove 11a during their upward movement, the triggering of the control cylinder 5d can be discontinued. The open position of the double seat mechanism can be seen in FIG. 8. In the open position of the double seat valve, the seat disk 5 and the piston-like closing element 4 are coupled together, that is, locked against each other. This inter-locking is provided by the inner and outer balls 12 and 13. The inner balls 12 link the hollow stem head 4b with the control piston 10 and the outer balls 13 link the spring chamber 5c, and thus the valve stem 5a to the control piston 10. This inter-locking is an advantage not found in the device shown in FIG. 6. A shift of the piston-like closing element 4 in an upward direction and thus an opening of the leakage cavity 3 within the valve casing part 1 is safely prevented during the cleaning of the leakage cavity 3 by cleansing and/or disinfecting agents R supplied through the cleansing agent connection 14a.

The closing of the double seat valve reverses this sequence. First, during the closing process, the ring 14 on the piston-like closing element 4 comes to rest at the stop 11d as shown in FIG. 10. At the same time the control piston 10, which is moved relative to the control cylinder base 5g, by the force of the spring 9, pushes the outer balls 13 into the groove 11a during the downward movement of the valve stem 5a and the control cylinder 5d. To the extent that the stem groove 5e permits the inner balls 12 to move inward as the valve stem 5a continues downward, the inner balls 12 are pushed inward by the control piston 10 and, finally, are prevented from moving radially outward by the control piston borehole 10c when the seat disk 5 reaches its closed position and the control piston 10 is at rest.

In order to be absolutely sure that the radial ball movements which are caused by the spring-loaded control piston 10 were indeed carried out in the final phase of the closing process, the position of the control piston 10 is detected and indicated by the position indicating mechanism 16. Only when the control piston 10 is at rest, is it sufficiently certain that the outer balls 13 are in the insert groove 11a and the inner balls 12 are in the stem groove 5e so that the seat disc 5 as well as the piston-like closing element 4 are on their respective seats. The position indicating mechanism 16 is arranged at a position along the valve stem such that the contact pin 16a extending through the control piston jacket 10d is only activated when the control piston 10 is in its resting position. Thus, the indicating mechanism 16 receives an input indicating the closed position of the double seat valve (FIG. 12a).

Figure 11:
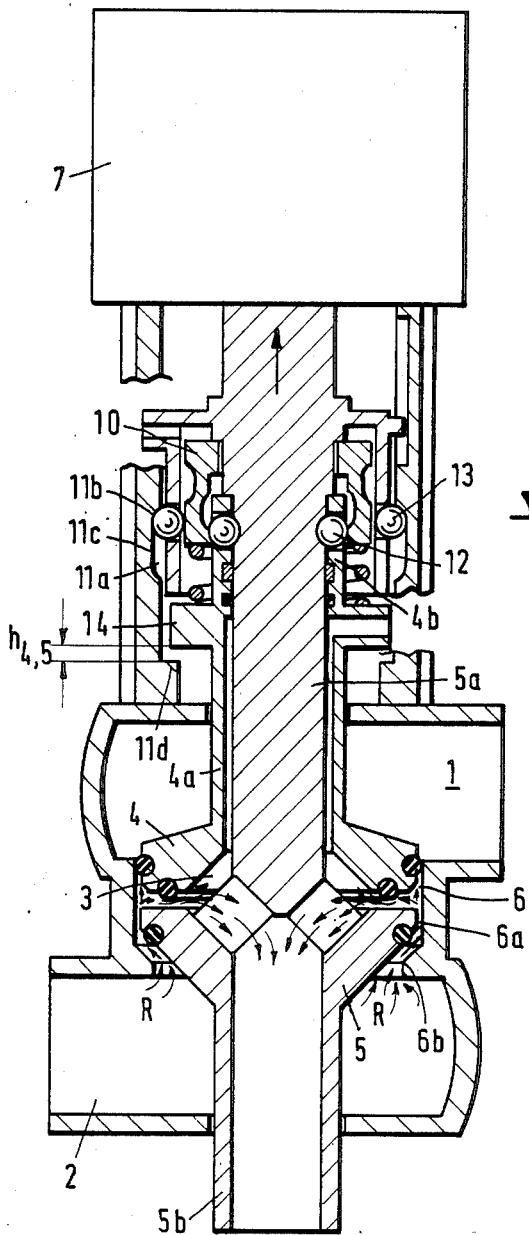
FIG. 11 is a longitudinal cross section through the double seat valve according to the aforementioned embodiment in its cleaning position, showing its seat cleaning position.

Seat cleaning for the double seat valve shown in FIG. 11 can only be initiated when the position indicating mechanism 16 indicates that the double seat valve is closed. Accordingly, the initial position for seat cleaning is the arrangement of the components described above that is shown in FIG. 7. Only the activating mechanism 7 is used during seat cleaning, so that the hollow stem head 4b and hollow stem 4a are lifted simultaneously with the valve stem 5a. The distance between the seat disc 5 and the slide-like closing element 4 is thus continually maintained and the double seat valve remains closed to product present in valve casing 1, as shown. The upward movement of the components linked together by the inner and outer balls 12 and 13 ends when the outer balls 13 come to rest against the upper flank area 11b of the groove 11a which limits the partial lift. In this position, the seat disc 5 as well as piston-like closing element 4 has moved upward from its seat in the partial lift $h_{4,5}$. Thus, an inflow feed gap 15a for the cleaning agent R is opened between the seat disc 5 and its seat surface 6b. By shifting the piston-like closing element 4 toward the valve casing part 1 that is in contact with the product, a ring-shaped strip corresponding to the partial lift $h_{4,5}$ is exposed on the surface of the cylinder borehole 6 that is ordinarily in contact with the product. The cleaning and/or disinfecting agent R can now enter the leakage cavity 3 by way of the inflow gap 15a between the seat disc 5 and its seat surface 6b and the throttling gap 6a between the seat disc 5 and the cylinder borehole 6. By giving the outlet of the throttling gap 6a a nozzle-like shape, the seat surface of the piston-like closing element 4 on the cylinder borehole 6 which is exposed by the partial lift $h_{4,5}$, can be rinsed in a targeted manner with cleaning and/or disinfecting agent R. A pressure build-up in the leakage cavity is avoided by selecting appropriate dimensions for the inflow gap and for the outflow gap between the seat disc 5 and the piston-like closing element 4. The cleaning and/or disinfecting agent R is discharged by gravity flow through the pipe 5b which is connected with the seat disk 5 and extends downward out of the valve casing part 2.

The double seat valve can be cleaned by a single partial lift or by pulse-like, repeated partial lift movements.

I claim:

1. A valve with two seat surfaces in a bore connecting first and second valve casings, said valve adapted to permit simultaneous cleaning of both seat surfaces without contaminating product that is in one of the valve casings, said valve comprising:
   first and second closing elements, selectively contacting said seat surfaces to define valve-open and valve-closed positions, said closing elements being moveable between valve-closed and valve-open positions and moveable relative to one another for closing the opening a leakage cavity between said closing elements, one of said closing elements being in contact with the product during the cleaning of the seat surfaces;
   an activating mechanism for moving at least one of said closing elements between a valve-closed and a valve-open position, at least one of said closing elements having a piston-like structure adapted for radially sealing said leakage cavity from said valve casings, said leakage cavity opening outside said double seat valve through an opening within a valve stem of one of said closing elements; and
   means for limiting the movement of said piston-like element within said bore to a partial lift in the direction of a valve casing carrying the product, for cleaning the seat of said piston-like closing element, while simultaneously providing a partial lift to the other closing element in a direction such that both seat surfaces are exposed for contact with a cleaning agent.

2. The valve as set forth in claim 1, wherein said activating mechanism comprises means for repeatedly moving at least one of said closing elements, and said limiting means comprising means for repeatedly limiting movement of said piston-like closing element provided by the activating mechanism.

3. The valve as set forth in claim 2, wherein each of said closing elements is piston-like.

4. The valve as set forth in claim 2, wherein the first valve casing carries the product, the seat surface of said second closing element is positioned between the seat surface of said first closing element and said second valve casing and, in the partial lift condition for cleaning, said first closing element is in sealing engagement with said bore between the seat surface of said first closing element and the first valve casing, and said second valve casing defines a passage for feeding cleaning agent to said valve seat surfaces.

5. The valve as set forth in claim 2 wherein said movement limiting means comprises means coupling the closing elements to each other for simultaneous movement by said activating mechanism and wherein the closing element in contact with product comprises a piston-like structure while the other closing element comprises a seat disc whereby the cleaning agent is provided to the two exposed seat surfaces.

6. The valve as set forth in claim 1, wherein each of said closing elements is piston-like.

7. The valve as set forth in claim 1, wherein the first valve casing carries the product, the seat surface of said second closing element is positioned between the seat surface of said first closing element and said second valve casing, said first closing element is in sealing engagement with said bore between the seat surface of said first closing element and the first valve casing, and said second valve casing defines a passage for feeding cleaning agent to said valve seat surfaces.

8. The valve as set forth in claim 1 wherein said movement limiting means comprises means coupling the closing elements to each other for simultaneous movement by said activating mechanism and wherein the closing element in contact with product comprises a piston-like structure while the other closing element comprises a seat disc whereby the cleaning agent is provided to the two exposed seat surfaces.

9. The valve as set forth in claim 1 wherein an inflow gap for supplying the cleaning agent between the other closing element and its seat surface is defined when the other closing element is in a partial lift position, said inflow gap causing a higher pressure loss in the flow of cleaning agent than an outflow gap provided for said cleaning agent between the other closing element and the piston-like closing element.

10. The valve according to claim 9 wherein an annular-shaped throttling gap is formed by the other closing element and the bore opening, said throttling gap causing a higher pressure loss in the flow of cleaning agent than a feed gap provided between the the other closing element and its seat surface, said throttling gap being nozzle-like in shape so that the seat surface of the piston-like closing element exposed by the partial lift is thereby rinsed in a targeted manner by the cleaning agent.

11. The valve according to claim 1 wherein an annular-shaped throttling gap is formed by the other closing element and the bore opening, said throttling gap causing a higher pressure loss in the flow of cleaning agent than a feed gap provided between the other closing element and its seat surface, when the other closing element is lifted off its seat, said throttling gap being nozzle-like in shape so that the seat of the piston-like closing element exposed by the partial lift is thereby rinsed in a targeted manner by the cleaning agent.

12. A valve having at least two seat surfaces and product present on at least one side of the valve, said valve comprising:
   a first valve casing;
   a second valve casing connected to said first valve casing so as to define a bore opening therebetween;
   first and second closing elements selectively contacting the seat surfaces of said valve to define a valve-open and a valve-closed position, said closing elements being coupled with each other, one of said closing elements being in contact with said product during cleaning of the valve seats and adapted for sliding movement in said bore opening,
   an activating mechanism for moving said first and said second closing elements to provide a partial lift thereto to expose both of said seat surfaces for cleaning with a cleaning agent;
   connecting means for receiving a pressure agent and a cylindrical hub fastened to a valve stem, said cylindrical hub having a control cylinder fastened thereto, said valve stem being connected to one of said closing elements;
   a control piston having a circular cross section arranged between said control cylinder and said hub, said control piston including inner and outer control piston grooves on its inner and outer cylindrical surfaces, respectively, said control piston being biased into a resting position by a spring connected to a hollow stem, said hollow stem being connected to the other of said closing elements, said hollow stem telescopingly receiving said valve stem;

said valve stem including a circular stem groove proximate to said hollow stem;

at least two stem housing inserts having a circular-segment cross-section, said inserts arranged in a stem housing concentrically enclosing said control cylinder, each of said inserts being provided with a groove on an inner surface thereof;

two groups of cylindrical-bore openings, the openings in each group having axes intersecting the longitudinal valve axis at a respective given point, said cylindrical-bore openings being distributed along a circumference of the hollow stem head portion of said hollow stem and a circumference of the control cylinder that is enclosed by said part of the stem housing insert;

a ball in each of said cylindrical-bore openings, said ball having a diameter approximately the same as the diameter of the respective cylindrical bore opening and being adapted to move in the direction of the axis of the bore opening, the diameter of said balls in said control cylinder being substantially smaller than the width of the grooves in said inserts; and a pin connected with the outer surface of the control cylinder and adapted for shifting movement in the direction of the longitudinal valve axis, said pin engaging a longitudinal groove in said stem housing insert.

13. The valve as set forth in claim 12, further including an annular gap between the hollow stem and the valve stem, said annular gap extending to said leakage cavity, and a connection on the hollow stem head in fluid connection with said annular gap, whereby said cleaning agent is provided to said leakage cavity.

14. The valve as set forth in claim 13, further including an indicating mechanism, wherein said indicating mechanism includes a movable component for indicating the closed position of both closing elements of the valve for sensing a predetermined closed position of the double seat valve by sensing a given position of the hollow stem relative to the position of the valve stem, said given position corresponding to said predetermined closed position.

15. The valve as set forth in claim 13, further including an indicating mechanism for indicating the position of a movable component of the valve, said position of said component indicating that the closing element in contact with product is in a closed position.

16. The valve as set forth in claim 15, wherein said movable component includes said control piston said control piston in its resting position cooperating with said indicating mechanism for signaling that the closing element in contact with product in said double seat valve is in the closed position, said including a contact pin and means for transmitting a binary digital electric output signal representative of said closed position.

17. Control apparatus for use with a valve having a bore opening, two closing elements moveable relative to each other, at least one of said closing elements being piston-like, a seat in said bore opening for each of said closing elements, and an activating mechanism for driving said closing elements, product being present on a side of the valve adjacent to the piston-like closing element, said control apparatus comprising:

stop means for selectably limiting movement of the piston-like closing element away from its seat surface to a partial lift position in which said other closing element seals said bore opening from the ingress of product; and means for selectably, simultaneously lifting the other closing element away from its seat surface, thereby permitting cleaning of the seats of both closing elements simultaneously while product is present on said side of the valve when the piston-like closing element is lifted to a partial lift.

18. Control apparatus as claimed in claim 17 wherein said means for selectably lifting the other closing element comprises a controllable connection between the closing elements, thereby causing them to move simultaneously.

* * * * *

UNITED STATES PATENT AND TRADEMARK OFFICE
CERTIFICATE OF CORRECTION

PATENT NO. : 4,687,015
DATED : August 18, 1987
INVENTOR(S) : Hans O.E. Mieth

It is certified that error appears in the above-identified patent and that said Letters Patent is hereby corrected as shown below:

Column 3, line 41, "like" has been changed to --lift--;

Column 6, line 8, "stops" has been changed to --stop--;

line 27, "actuation system" has been changed to --activating mechanism--;

line 50, after "connector", --V-- has been inserted;

Column 11, line 11, "the" has been changed to --and--.

Signed and Sealed this

Twenty-ninth Day of December, 1987

Attest:

DONALD J. QUIGG

*Attesting Officer*      *Commissioner of Patents and Trademarks*